US009938960B2

(12) United States Patent
Gabeiras et al.

(10) Patent No.: US 9,938,960 B2
(45) Date of Patent: Apr. 10, 2018

(54) WIND TURBINE—FLOATING PLATFORM ASSEMBLY AND METHOD FOR ORIENTING SAID ASSEMBLY DESCRIPTION

(75) Inventors: Teresa Arlabán Gabeiras, Sarriguren (ES); José Miguel García Sayés, Sarriguren (ES); Miguel Núñez Polo, Sarriguren (ES)

(73) Assignee: ACCONIA WINDPOWER, S.A., Sarriguren (Navarra) (ES)

( * ) Notice: Subject to any disclaimer, the term of this patent is extended or adjusted under 35 U.S.C. 154(b) by 1420 days.

(21) Appl. No.: 13/339,973

(22) Filed: Dec. 29, 2011

(65) Prior Publication Data

US 2012/0171034 A1 Jul. 5, 2012

(30) Foreign Application Priority Data

Dec. 29, 2010 (ES) .................... 201031996

(51) Int. Cl.
*F03D 7/02* (2006.01)
*B63B 39/02* (2006.01)
*F03D 13/25* (2016.01)

(52) U.S. Cl.
CPC ............ *F03D 7/0204* (2013.01); *B63B 39/02* (2013.01); *F03D 13/25* (2016.05); *F05B 2240/93* (2013.01); *F05B 2270/18* (2013.01); *F05B 2270/321* (2013.01); *F05B 2270/326* (2013.01); *F05B 2270/33* (2013.01); *Y02E 10/723* (2013.01); *Y02E 10/727* (2013.01)

(58) Field of Classification Search
CPC ...................................... F03D 7/0204
USPC ................. 416/9, 85, 84, 86; 415/7
See application file for complete search history.

(56) References Cited

U.S. PATENT DOCUMENTS

2009/0317250 A1* 12/2009 Gamble et al. ................. 416/1

FOREIGN PATENT DOCUMENTS

WO  WO 2009131826 A2 * 10/2009
WO  WO 2010021655 A2 *  2/2010

* cited by examiner

*Primary Examiner* — Richard Edgar
(74) *Attorney, Agent, or Firm* — Merchant & Gould P.C.

(57) ABSTRACT

The invention allows orientation of the platform (1) in order to obtain conditions of maximum efficiency in the wind turbine (16). It comprises first sensors (8) for detecting an effective rotation axis angle (δ) formed between the rotation axis (2) and a horizontal plane (24); second sensors (9) for detecting wind direction (23); platform orientation means (11) for modifying the effective rotation axis angle (δ); and at least one control unit (12) adapted for receiving a first input (13) from the first sensors (8) and a second input (14) from the second sensors (9) and, based on said inputs (13, 14), transmitting orders to the platform orientation means (11) and yaw mechanism.

15 Claims, 4 Drawing Sheets

WIND TURBINE—FLOATING PLATFORM ASSEMBLY AND METHOD FOR ORIENTING SAID ASSEMBLY DESCRIPTION

This application claims benefit of Serial No. P201031996, filed 29 Dec. 2010 in Spain and which application is incorporated herein by reference in its entirety.

OBJECT OF THE INVENTION

The present invention can be included within the technical field of wind energy, more specifically, using wind turbines disposed on floating platforms.

The object of the present invention relates to an assembly formed by a wind turbine and a floating platform whereupon said wind turbine is disposed, as well as a process for orienting said assembly.

BACKGROUND OF THE INVENTION

The so-called horizontal axis wind turbines, used for transforming wind energy into electricity, comprise, as is already known, a tower, a nacelle and a wind rotor having at least two blades. Due to the action of the wind incident upon the blades, the rotor rotates around an axis which orientation is substantially horizontal with respect to the ground. In turn, the nacelle can rotate around the longitudinal axis of the tower to orient the rotor axis windward (in upwind-type wind turbines, where the wind firstly strikes the rotor and then the tower that supports the gondola) or leeward (in downwind-type wind turbines where the wind firstly strikes the tower and then the rotor).

Moreover, offshore wind energy is currently under development. In this case, the wind turbines are installed at sea (or on lakes), either on support structures fixed to the seabed or supported by floating platforms.

There are trends, in current wind turbine design, aimed at increasing blade length to increase the rated power of the wind turbines and to increase annual energy production per wind turbine, as well as at manufacturing the blades from more flexible and lighter materials for the purpose of obtaining a convenient weight/rigidity ratio.

This last design trend has the drawback that, in upwind-type horizontal-axis wind turbines, deflection of the blades produced by strong winds tends to push the tip of the blades towards the tower, which would cause irreparable damage to the blades and to the tower in case of contact therewith.

In order to solve this problem, one solution would be to provide the blades with sufficient rigidity to minimise their deflection. However, providing the blades with a high degree of rigidity implies increasing their weight and therefore price. Additionally, the greater weight of the rotor implies an increase in the cost of other structural parts of the wind turbine and platform.

Another possible solution consists of disposing the axis forming a small angle with respect to the horizontal, called tilt angle, in such a manner that during rotation the tip of the blades is farther away from the tower on passing in front of said tower.

A double drawback of using rotors mounted with a tilt angle greater than zero is that the performance of the machine is modified proportionally to the cube of the cosine of the tilt angle, due to the fact that the wind acquires a component not parallel to the rotor axis, in addition to the fact that said non-parallel component produces additional loads on the wind turbine.

Table 1 below illustrates the relationship between the tilt angle, the cube of the cosine of said tilt angle and the loss of power resulting from having said angle with respect to an angle equal to zero, at a wind speed where the captured power is less than the rated power of the wind turbine, obtained from the equation for power captured by the wind turbine given by the approximate formula:

$$P = \frac{1}{2} \cdot \rho \cdot A_1 \cdot Cp \cdot v^3 \cdot \cos^3(\text{tilt})$$

where P is the captured power, $\rho$ is air density, $A_1$ is the surface area swept by the blades, Cp is a coefficient associated with the blades and v is wind speed.

TABLE 1

Relationship between loss of captured power and tilt angle.

| Tilt | Cos³(tilt) | Loss |
|------|------------|------|
| 2 | 0.998173594 | 0.18% |
| 4 | 0.992709938 | 0.73% |
| 6 | 0.093655551 | 1.63% |
| 8 | 0.971087416 | 2.89% |
| 10 | 0.955112166 | 4.49% |
| 12 | 0.935864949 | 6.41% |
| 14 | 0.913508001 | 8.65% |

On the other hand, as can be observed in FIG. 1, the wind that strikes the blades of a wind turbine disposed on a floating platform exerts a driving force which has the effect of leaning the tower leeward at a given tower pitch angle which, in the case of upwind generators, increases the rotor axis orientation angle, moving from being equal to the tilt angle to being equal to the sum of said tilt angle plus the tower pitch angle, with the ensuing additional loss of efficiency, as previously explained.

The technical problem addressed consists of describing a device and method for controlling the orientation of a floating platform for an upwind-type wind turbine having a rotor axis with a tilt angle greater than zero, allowing the maximising of the wind turbine efficiency.

DESCRIPTION OF THE INVENTION

The present invention solves the problem by means of, according to a first aspect of the invention, a wind turbine—floating platform assembly which comprises an upwind-type wind turbine (wherein the wind firstly strikes the rotor and then the tower, by opposition to a downwind-type wind turbine, wherein the wind firstly strikes against the tower and then the rotor), disposed on a floating platform, where the wind turbine comprises:
- a tower fixed to the platform;
- a nacelle, disposed on the tower to support a rotor, and having a yaw mechanism to orient the rotor windward, said yaw mechanism enabling the nacelle to rotate with respect to the tower around the longitudinal axis of said tower; the rotor comprising at least two blades capable of making the rotor rotate around a rotation axis due to the action of the wind striking against said blades, the rotation axis having a tilt angle ($\theta$), formed between said rotation axis and a plane perpendicular to the longitudinal axis of the tower, non equal to zero.

The assembly of the invention is characterised in that it also comprises:

first sensors for detecting an effective angle (δ) of the rotation axis, formed between the rotor axis and a horizontal plane;

second sensors for detecting wind direction;

orientation means for orienting the platform for modifying the effective rotation axis angle (δ); and a control unit adapted for receiving a first input from the first sensors and a second input from the second sensors and, based on said inputs, transmitting orders to the orientation means and to the yaw mechanism.

The assembly of the invention operates in accordance with, according to a second aspect of the invention, a method for orienting said assembly which comprises the following steps:

capturing the first input by means of the first sensors;

communicating the first input to the control unit;

capturing the second input by means of the second sensors;

communicating said second input to the control unit; and ordering the orientation means, through the control unit, to orient the platform in accordance with the first input and second input, in such a manner that the effective rotation axis angle is, in absolute value, smaller than the tilt angle (θ).

According to a preferred embodiment of the invention, the control unit, upon receiving the first input and the second input, sends a signal to the yaw mechanism in accordance with the second input in order to dispose the rotor opposite to the direction of the wind, as well as sending a signal to the orientation means in accordance with the first and second input in order to lean the tower windward (against the wind) a value equal to θ, in such a manner that the rotation axis is disposed in a horizontal position, i.e. according to an effective angle (δ) substantially equal to zero. This is the preferred orientation for maximum efficiency. Alternatively, the orientation for maximum efficiency can be a value not equal to zero and smaller than the tilt angle (θ), in the event the tower loads are increased due to prolonged exposure to a high leaning, in that case, a compromise solution between efficiency in obtaining power and the value of said loads that minimises the cost of the energy produced.

Obviously, it would be equivalent to use a first control unit to control the yaw mechanism and a second control unit to control the platform orientation means.

On the other hand, once the rotor is correctly disposed opposite to the direction of the wind, detection of the position of the yaw mechanism provides a signal equivalent to the direction of the wind which can be sent as an input signal to the orientation means.

In accordance with a preferred embodiment of the invention, the blades additionally comprise limiting means for limiting the power obtained at wind speeds greater than a certain threshold speed. Known examples of said limiting means relate to blade pitch angle control means for enabling said blades to rotate with respect to their longitudinal axis in order to modify the angle of attack of the wind against the blades or, alternatively, the limiting means can comprise a certain adapted configuration of the blades so that, in case of strong winds, at least one part of the blade stalls, producing a reduction in the power obtained.

The invention can also incorporate third sensors for measuring at least one magnitude selected from among: speed of the wind incident upon the tower, rotor rotation speed, angle of orientation of the blades in relation to their longitudinal axis and instantaneous power generated; additionally, the control unit is adapted to receive a third input from the third sensors and, based on said first, second and third inputs, transmit orders to the orientation means.

In the event that the assembly of the invention comprises third sensors, the method of the invention may include the additional steps of previously capturing the third input by means of the third sensors; communicate the third input to the control unit; compare the value of the third input with a previously defined threshold value; and, when the condition that the value of the third input does not exceed the threshold value is fulfilled, orient the tower windward, as explained above.

In one embodiment, the leaning angle of the tower depends on the values of the third input, for example, in accordance with wind speed values. Said relationship can be a certain function or a table with discrete values, as will be explained below.

Preferably, the orientation means comprise active means for controlling the position of the centre of buoyancy of the assembly by modifying certain submerged elements. In particular, the orientation means can comprise a plurality of floats disposed on the lower part of the platform; chambers disposed on the lower part of the floats; and first impulsion means for impelling air to the chambers through conduits, where said conduits can preferably interconnect the chambers. Likewise, the first propulsion means can comprise at least one compressor.

Use of the assembly and device of the invention allows keeping the rotation axis at an orientation such as to maximise wind turbine efficiency, taking into account the configuration of the tower, tilt angle and, eventually, wind speed, blade pitch angle or power generated.

The invention allows faster modification of the relative position of the centres of gravity and buoyancy, in such a manner that transferring the air between chambers can dampen the platform's oscillations, the typical period of said oscillations being 15-40 s. To this end, the options would be: a passive system (the dimensioning of the chambers and conduits would produce dampening), semi-active system (controlling the transfer of air between chambers by means of valves) or active system (controlling the impulsion means).

The device and method of the invention allow the use of wind turbines having a greater tilt angle, which allows the use of longer and flexible blades, with the consequent savings in weight and costs and consequent increase in rated power and in the annual production. Likewise, it enables the use of a tower having a distribution of greater diameters throughout the length thereof, which is advisable for optimising the cost thereof.

Likewise, leaning the rotor plane maximises energy capture, on minimising the wind component that induces loads in the wind turbine that do not result in power generation.

Additionally, the driving force exerted by the wind on the rotor introduces overturning moment at the base of the tower which is balanced by the moment associated with the weight of the nacelle, as the gondola is in a forward position with respect to the tower base.

DESCRIPTION OF THE DRAWINGS

In order to complete the description being made and with the object of helping to better understand the features of the invention, in accordance with a preferred embodiment thereof, accompanying said description as an integral part thereof is a set of drawings wherein the following has been represented in an illustrative and non-limiting manner.

PREFERRED EMBODIMENTS OF THE INVENTION

Figure 1:
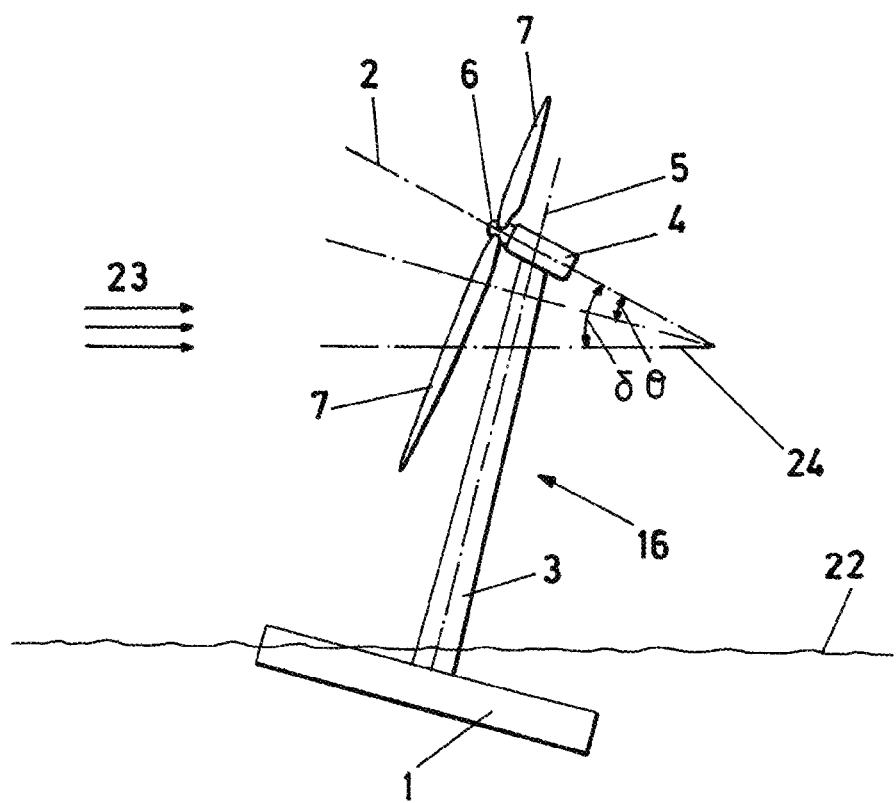
FIG. 1.—Shows a view of a wind turbine-floating platform assembly not covered by claims.
Figure 2:
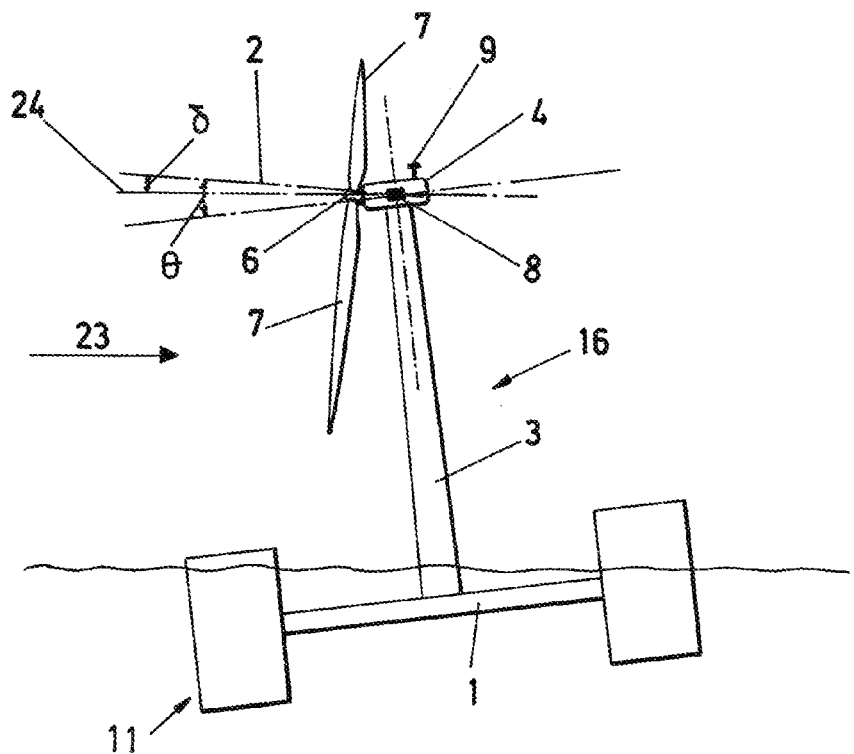
FIG. 2.—Shows a wind turbine-floating platform assembly in accordance with the invention, illustrating the operation of the orientation means.

The wind turbine (16)—floating platform (1) assembly in accordance with the invention shown in FIG. 2 comprises an upwind-type wind turbine (16) disposed on a floating platform (1), where the wind turbine comprises:
 a tower (3) fixed to the platform (1);
 a nacelle (4) disposed on the tower (3) for supporting a rotor (6), and having a yaw mechanism (not shown) to orient the rotor (6) windward, said yaw mechanism enabling the nacelle (4) to rotate with respect to the tower (3) around the longitudinal axis of said tower (3);
 the rotor (6) comprising at least two blades (7) capable of making the rotor (6) rotate around a rotation axis (2) due to the action of the wind incident upon said blades (7), the rotation axis (2) having a tilt angle (θ), formed between the rotation axis (2) and a plane perpendicular to the longitudinal axis of the tower (3), non equal to zero.

The assembly additionally comprises:
 first sensors (8) for detecting an effective angle (δ) of the rotation axis, formed between the rotation axis (2) and a horizontal plane (24);
 second sensors (9) for detecting wind direction (23);
 orientation means (11) for modifying the effective angle (δ) of the rotation axis (2); and
 limiting means for limiting the power obtained at wind speeds greater than a certain threshold speed, where said limiting means comprise means for controlling blade pitch for enabling said blades (7) to rotate with respect to their longitudinal axis in order to vary the surface area of the blades (7) exposed to the wind.

The assembly additionally includes:
 third sensors (10) for measuring at least one magnitude selected from among: the speed of the wind incident upon the tower (3), the speed of rotation of the rotor (6), the angle of orientation of the blades (7) with respect to their longitudinal axis and the instantaneous power generated; the control unit (12) being adapted to receive a third input (15), from the third sensors (10) and, based on said inputs (13, 14, 15), transmit orders to the orientation means (11); and
 a control unit (12) adapted to receive a first input (13), from the first sensors (8) and a second input (14) from the second sensors (9) and, based on said inputs (13, 14), transmit orders to the platform orientation means (11) and to the yaw mechanism.

Figure 5:
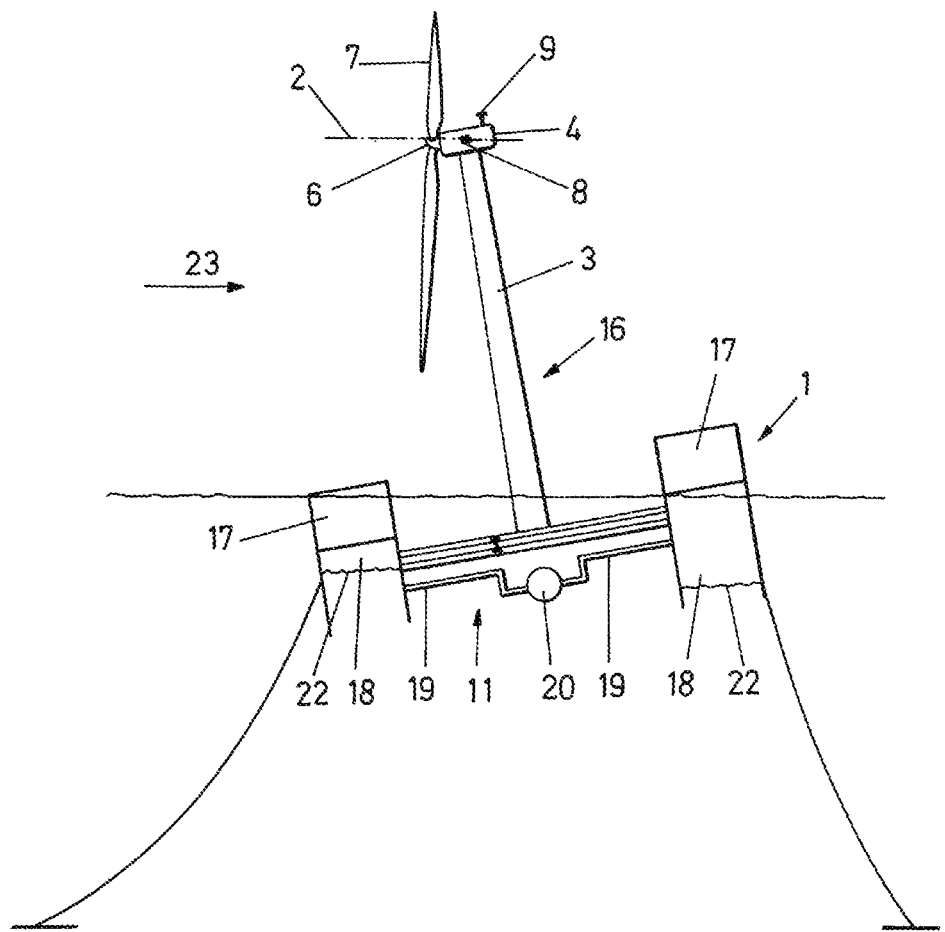
FIG. 5.—Shows a view of the orientation means according to the first embodiment.

The orientation means (11), see FIG. 5, comprise active means for controlling the position of the centre of buoyancy by modifying submerged elements, preferably floats (17) linked to the platform (1). In a preferred embodiment, the submerged elements are modified without modifying the distribution of the platform masses. This can be done by modifying the submerged part of the floats (17) or, alternatively, by modifying the amount of air confined in a lower chamber (18) of said floats (17). In particular, in a previously explained preferred embodiment of the second alternative, the orientation means (11) comprise: a plurality of floats (17) disposed on the lower part of the platform (1); chambers (18) disposed on the lower part of the floats (17); impulsion means (20) for impelling air to the chambers (18) through conduits (19), thereby modifying the amount of air confined within said chambers and the water surface (22), where the conduits (19) interconnect the plurality of chambers (18). The impulsion means (20) comprise at least one compressor (20).

Figure 4:
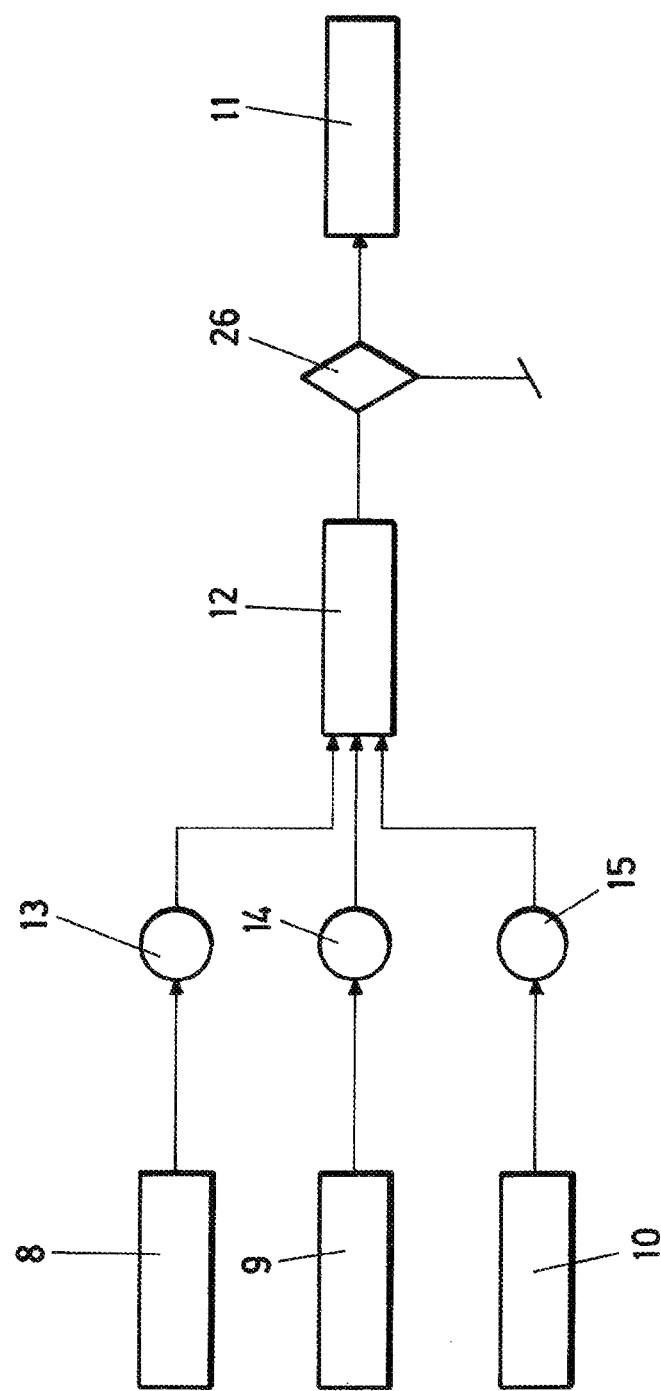
FIG. 4.—Shows a schematic diagram illustrating the method in accordance with the invention.

In accordance with a first embodiment of the invention, a method is presented for orienting the assembly of the invention which comprises the following steps, as shown in FIG. 4:
 capturing the first input (13) by means of the first sensors (8);
 communicating the first input (13) to the control unit (12);
 capturing the second input (14) by means of the second sensors (9);
 communicating said second input (14) to the control unit (12); and
 ordering the orientation means (11), through the control unit (12), to orient the platform (1) based on the first input (13) and the second input (14), in such a manner that the effective rotation axis angle (2) is, in absolute value, smaller than the tilt angle (θ).

In accordance with a second embodiment, the method of the invention comprises the additional steps of:
 capturing a third input (15) by means of the third sensors (10);
 communicating said third input (15) to the control unit (12); and
 comparing the value of the third input (15) to the previously defined threshold value and, when the condition that the value of the third input (15) does not exceed the threshold value is fulfilled, ordering the orientation means to orient the platform in accordance with the first input (13), the second input (14) and the third input (15).

In a third preferred embodiment of the invention, a third input signal is used for controlling leaning, said signal being selected from among the following: wind speed, rotor rotation speed, electricity generated or blade pitch angle.

Control of the angle of blade pitch towards feathered position to control rotor rotation speed within the rated wind range is typical in wind turbines. The variation in blade pitch angle limits wind energy capture as of the moment in which the wind turbine reaches its rated rotation speed and power limits. In this case, when the third input (15), which provides a wind speed value, or blade pitch or rated power or rotor rotation regime value, reaches a predetermined threshold value, the control unit (12) does not transmit instructions to the orientation means (11), allowing the tower (3) to adopt a leeward leaning given by the force of the wind, and allowing the limiting means to control the power generated.

This situation does not increase the moment at the base of the tower or the fatigue loads produced by said moment. Fatigue loads are the result of the magnitude of the force and occurrence thereof. In a system with control over the angle of blade pitch towards feathered position, the driving force of the wind decreases when said pitch control becomes activated and strong wind occurrence is low.

In accordance with a preferred embodiment, the effective angle (δ) of the rotation axis (2) depends on the third input, in particular, on a series of speed wind values, as explained below.

Figure 3:
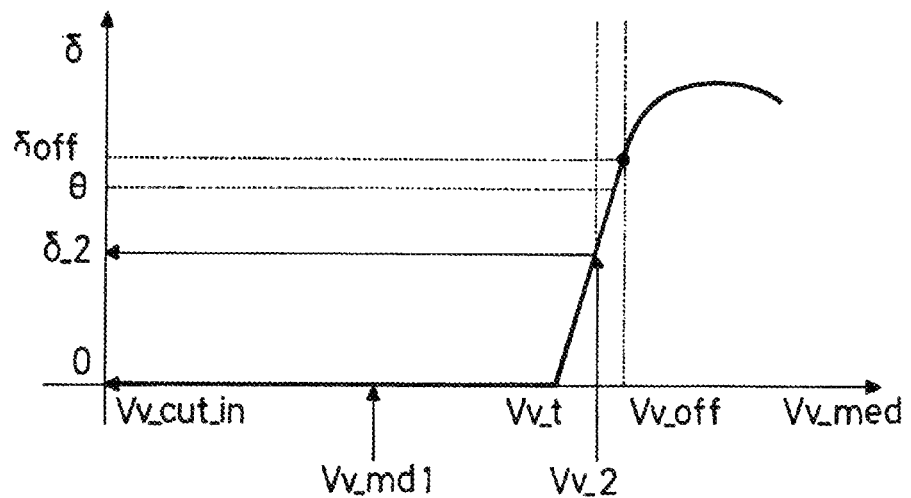
FIG. 3.—Shows a graphic representing the evolution of the effective angle (δ) of the rotation axis in accordance with wind speed according to a preferred embodiment of the method of the invention.

FIG. 3 shows how, based on a wind speed threshold (Vv-off), the orientation means (11) stop receiving instructions and, for wind speeds greater than said speed Vv-off, the resulting effective rotation axis angle (δ) evolves freely, firstly increasing and then decreasing, due to the fact that the driving force of the wind decreases upon activation of blade pitch control.

In a transition zone between a reference value (Vv-t) and Vv-off, the effective angle (δ) increases gradually (or ramps up), in such a manner that at Vv-off speed it reaches the δ-off value or deactivation angle. Said value is that in which the wind turbine generates rated power with a wind speed equal to Vv-off and a blade pitch angle equal to β-off. Vv-2 speed marks the wind speed at which the rated power is reached, where control of blade pitch towards feathered position preferably becomes activated. Said Vv-2 speed is comprised within the range [Vv-t, Vv-off], capable of adopting any value. At Vv-off speed a blade pitch angle threshold is reached (β-off) which alternatively determines that the orientation means (11) stop receiving instructions.

Within a range of wind speeds comprised between the Vv-cut-in and Vv-t, the resulting angle (δ) has a mean value approximately equal to zero.

Table 2 below shows a simplified diagram illustrating the foregoing. Vv-med represents the wind speed value.

TABLE 2

Relationship between angle δ and wind speed Vv-med.

| Vv_med | δ |
| --- | --- |
| Vv-cut-in < Vv-med < Vv-t | 0 |
| Vv-t <= Vv-med < Vv-off | <0 |
| Vv-med > Vv-off | The orientation means do not receive instructions |

In this manner, the evolution of the effective rotation axis angle is controlled upon actuation of the orientation means of the platform in a convenient manner, in such a manner that:
- the effective rotation axis angle is substantially equal to the angle of maximum efficiency with light and moderate winds (less than Vv-t), maximising production;
- the effective rotation axis angle evolves freely under strong winds (greater than Vv-off) where wind energy is greater than that which the wind turbine can transform into electrical power, reducing the loads on the wind turbine and the actuation of the blade pitch regulation mechanism, as well as the actuation of the platform orientation mechanism;
- the effective rotation axis angle evolves gradually from the angle of maximum efficiency to the deactivation angle, in such a manner as to avoid sudden transitions.

Figure 6:
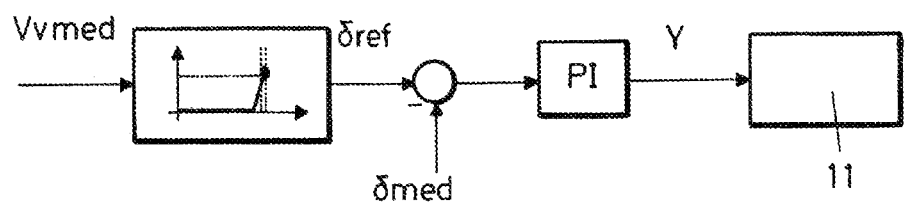
FIG. 6.—Shows a schematic view of the operation of the method according to a preferred embodiment.

FIG. 6 shows that when the orientation means are activated, i.e. for wind speeds of less than Vv-off, the control unit orders activation of the orientation means (11) based on the difference between a parameter value (δref) and the leaning value (δmed) of the rotation axis (2) detected by the first sensors (8). Based on said difference and using a regulator or any equivalent means known in the state of the art, the order (Y) is calculated and transmitted to the orientation means. Said parameter value (δref) is calculated based on the wind speed (Vv-med) measured by the third sensors (10) using a predefined function or table of values.

The invention claimed is:

1. A wind turbine-floating platform assembly comprising:
   a floating platform;
   an upwind-type wind turbine disposed on the floating platform,
   the upwind-type wind turbine comprising:
      a tower fixed to the floating platform,
      a nacelle disposed on the tower to support a rotor,
      a yaw mechanism located in the nacelle, the yaw mechanism configured to rotate the nacelle around a longitudinal axis of the tower, and
      at least two blades located in the rotor, the at least two blades being configured so as to cause a rotation of the rotor around a rotation axis, the rotation axis having a tilt angle, formed between the rotation axis and a plane perpendicular to the longitudinal axis of the tower, non equal to zero;
   at least one first sensor configured to detect an effective rotation axis angle formed between the rotation axis and a horizontal plane;
   at least one second sensor configured to detect wind direction;
   a platform orientation mechanism configured to modify the effective rotation axis angle; and
   a control unit configured to receive a first input from the at least one first sensor and a second input from the at least one second sensor and transmit instructions to the platform orientation mechanism based on the first input and the second input, as well as transmit instructions to the yaw mechanism based on the second input.

2. The assembly of claim 1, wherein the platform orientation mechanism comprises submerged elements associated with the platform and is configured to modify a position of the submerged elements.

3. The assembly of claim 2, wherein the submerged elements comprise a plurality of floats, and wherein the platform orientation mechanism is further configured to impel air, via conduits, toward a plurality of chambers associated with the plurality of floats.

4. The assembly of claim 3, wherein the plurality of chambers are interconnected via the conduits.

5. The assembly of claim 3, wherein the platform orientation mechanism comprises at least one compressor configured to impel the air.

6. The assembly of claim 1, wherein the at least two blades comprise a limitation mechanism configured to limit a caused rotation of the rotor for wind speeds exceeding a certain threshold value.

7. The assembly of claim 6, wherein the limitation mechanism is configured to cause the at least two blades to rotate with respect to their corresponding longitudinal axis in order to vary a blade surface area exposable to wind.

8. The assembly of claim 1, further comprising at least one third sensor configured to measure a magnitude of at least one of the following:
   speed of wind incident upon the tower,
   rotor rotation speed,
   blade orientation angle with respect to its corresponding longitudinal axis, and
   instantaneous power generated;
   wherein the first control unit is further configured to receive a third input from the at least one third sensor and, based at least in part on the third input, transmit the instructions to the platform orientation mechanism.

9. The assembly of claim 1, wherein the control unit comprises:
   a yaw subunit configured to control the yaw mechanism based on the second input, and
   an orientation subunit configured to control the platform orientation mechanism based on the first input and second input.

10. A method for orienting a wind turbine-floating platform assembly, the method comprising:
   receiving a first input via at least one first sensor, the first input being indicative of a rotation angle (δ) formed between a horizontal plane and a rotation axis of a rotor, the rotor being supported on a nacelle located on a tower of a wind turbine which is arranged on a floating platform, the rotation axis having a tilt angle (θ), formed between the rotation axis and a plane perpendicular to a longitudinal axis of the tower, non equal to zero;
   communicating the first input to a control unit;
   receiving a second input via at least one second sensor, the second input being indicative of a wind direction;
   communicating the second input to the control unit; and
   causing a variation in δ wherein the absolute value of δ is smaller than θ.

11. The method of claim 10, wherein causing the variation in δ comprises causing the tower to lean windward.

12. The method of claim 11, further comprising:
   receiving a third input by via at least one third sensor, the third input being indicative of at least one of the following:
      speed of the wind incident upon the tower,
      rotor rotation speed,
      blade orientation angle with respect to their longitudinal axis, and
      instantaneous power generated;
   communicating the third input to the control unit;
   comparing a value of said third input with a previously defined threshold value; and
   wherein causing the variation in δ comprises causing the variation in δ when the value of the third input does not exceed the threshold value.

13. The method of claim 10, wherein causing the variation in the δ comprises causing the variation in such a manner that the δ has a mean value substantially equal to zero.

14. The method of claim 12, wherein causing the variation in the δ comprises causing the variation in δ based on a difference between a parameter value and the first input value, the parameter value being calculated based on the third input value.

15. A wind turbine-floating platform assembly comprising:
   a floating platform;
   an upwind-type wind turbine disposed on the floating platform, the upwind-type wind turbine comprising:
      a tower fixed to the floating platform,
      a nacelle disposed on the tower to support a rotor,
      a yaw mechanism located in the nacelle, the yaw mechanism configured to rotate the nacelle around a longitudinal axis of the tower, and
      at least two blades located in the rotor, the at least two blades being configured so as to cause a rotation of the rotor around a rotation axis, the rotation axis having a tilt angle, formed between the rotation axis and a plane perpendicular to the longitudinal axis of the tower, non equal to zero;
   at least one first sensor configured to detect an effective rotation axis angle formed between the rotation axis and a horizontal plane;
   at least one second sensor configured to detect wind direction;
   a platform orientation mechanism configured to modify the effective rotation axis angle and
   a control unit configured to receive a first input from the at least one first sensor and a second input from the at least one second sensor and transmit instructions to the platform orientation mechanism based on the first input and the second input so as to lean the tower windward for compensating the effect of the wind and the tilt angle, as well as transmit instructions to the yaw mechanism based on the second input.

* * * * *